United States Patent
Zeitler et al.

[15] 3,663,392
[45] May 16, 1972

[54] CHLORINATING POWDERED VINYL CHLORIDE POLYMERS

[72] Inventors: Gerhard Zeitler, Hessheim; Hans-Georg Trieschmann, Hambach, both of Germany

[73] Assignee: Badische Anilin- & Soda-Fabrik Aktiengesellschaft, Ludwigshafen/Rhine, Germany

[22] Filed: June 18, 1970

[21] Appl. No.: 47,578

[30] Foreign Application Priority Data

June 27, 1969 Germany.....................P 19 32 589.4

[52] U.S. Cl.......................204/159.18, 260/85.5, 260/86.3, 260/87.1, 260/87.5, 260/87.7, 260/92.8
[51] Int. Cl. .......................................................C08f 27/02
[58] Field of Search..........204/159.18; 260/92.8 AC, 94.9 H

[56] References Cited

UNITED STATES PATENTS 2,590,651 3/1952 Rosenberg.......................204/159.18
3,532,612 10/1970 Weben et al..........................260/92.8
3,535,220 10/1970 Kato et al. ............................260/92.8

FOREIGN PATENTS OR APPLICATIONS 701,327 1/1965 Canada

Primary Examiner—Joseph L. Schofer
Assistant Examiner—Edward J. Smith
Attorney—Johnston, Root, O'Keeffe, Keil, Thompson & Shurtleff

[57] ABSTRACT

A process for the chlorination of vinyl chloride polymers in which a powdered vinyl chloride polymer is treated in a first stage with gaseous chlorine at below the softening point and under the action of light followed by a second stage in which it is treated at above the softening point while excluding light.

The products are homogeneously chlorinated and have a high thermostability; they may be used as special glasses and for hot water pipes.

6 Claims, No Drawings

CHLORINATING POWDERED VINYL CHLORIDE POLYMERS

The present invention relates to a process for the chlorination of powdered vinyl chloride polymers.

Polyvinyl chloride has found many uses and, of all plastics, is the one which is manufactured in the largest quantity. Its fairly low dimensional stability under heat however prevents its use for moldings which are exposed to strong thermal stress. An increase in the chlorine content by subsequent chlorination of polyvinyl chloride brings about an improvement in the dimensional stability under heat so that this disadvantage can be overcome.

In the conventional methods, afterchlorination is carried out in solution or suspension in chlorohydrocarbons or in aqueous solution. These methods have the disadvantage however that they necessitate an expensive separation of the chlorination products from the liquid followed by drying.

Chlorination of polyvinyl chloride in the gas phase has already been described in various publications. According to these prior art methods it is however not possible to prepare a homogeneously chlorinated product from conventional vinyl chloride polymers prepared by conventional industrial polymerization methods. Although inhomogeneously chlorinated polyvinyl chloride has a satisfactory dimensional stability under heat, it has too low a thermostability so that in thermal processing discoloration takes place due to elimination of hydrogen chloride.

It is an object of this invention to provide a process for the chlorination of vinyl chloride polymers which will give products having both high dimensional stability under heat and good thermostability.

We have now found that this object is achieved when the chlorination of dry powdered vinyl chloride polymers with gaseous chlorine is carried out in two stages in which chlorination takes place in a fairly short prereaction at a temperature below the softening point and under the action of light and in a more prolonged main reaction at temperatures above the softening point with substantial exclusion of light.

In this way it is surprisingly possible to obtain very homogeneously chlorinated products having high thermostability.

We have attempted to explain this phenomenon below.

In the prereaction, owing to the action of light, chlorination takes place very rapidly so that only the outermost layer of the polyvinyl chloride granules is chlorinated. Since the rate of chlorination is much higher than the rate of diffusion of chlorine, the interior of the polyvinyl chloride granules is not attacked.

In the main reaction the temperature is above the softening point of polyvinyl chloride but below the softening point of chlorinated polyvinyl chloride. The thin layer of chlorinated polyvinyl chloride prevents the polyvinyl chloride granules from agglomerating but on the other hand permits the gaseous chlorine to diffuse into the interior of the granules. Since the chlorination in the main reaction is carried out while excluding light, the rate of chlorination is much lower. In consequence of the higher temperature however the rate of diffusion of chlorine has become so high that a homogeneous chlorination of the whole of each granule can take place.

The process is suitable for chlorinating conventional vinyl chloride polymers, regardless of the process by which they have been obtained. It is however preferred to use polyvinyl chloride which has been prepared by polymerization of monomeric vinyl chloride in aqueous suspension. Copolymers of vinyl chloride with up to 30 percent by weight of comonomer(s) may also be chlorinated by the process according to this invention. Examples are copolymers with ethylene, propylene, vinyl acetate, vinyl ethers, vinylidene chloride, acryonitrile or acrylic esters.

Chlorination may be carried out with vinyl chloride polymers having any K value, but vinyl chloride polymers having K values of less than 75 are preferred because the flowability of products having higher K values is very low.

The process is suitable for the chlorination of powdered vinyl chloride polymers. The mean particle diameter should be within the range from 100 to 600, preferably from 200 to 400, microns.

Chlorination is carried out with gaseous chlorine in the presence or absence of an inert gas. The presence of small amounts of water vapor is also permissible but this has the disadvantage that together with the hydrogen chloride formed in the reaction it forms aqueous hydrochloric acid which may result in corrosion if offgas pipes.

The process is carried out in the absence of solvents or suspension agents; it is advantageous to use a rotating tube or a fluidized bed.

The prereaction is carried out at a temperature lower than the softening point of the vinyl chloride polymer. By softening point we mean the dimensional stability under heat according to Vicat (measured according to DIN 53,460). In the case of polyvinyl chloride the softening point is within the range from 75° to 85°C., and in the case of copolymers is generally a few degrees lower. The softening point is dependent on the K value, the method of production and the purity of the polymer. It is preferred to carry out the prereaction at a temperature of from 60° to 70°C. Care should be taken that the temperature does not rise above the softening point at any time during the prereaction because otherwise the polyvinyl chloride granules will agglomerate and may form large lumps. Agitation of the bed of powder and abstraction of heat are then seriously disturbed. It is essential that the prereaction should be carried out with exposure to light; both visible light and ultraviolet light are suitable, i.e. wavelengths of from 2,000 to 7,000 A. can be used. Ultraviolet radiation effects a very marked acceleration of the chlorination reaction. The prereaction should in this case last for only a few minutes because otherwise the outer chlorinated layer of the polyvinyl chloride granules becomes too thick and the degree of chlorination in this layer becomes too high. The acceleration is not so marked when visible light is used. The duration of the prereaction is dependent not only on the wavelength and intensity of the light but also on the reaction temperature and the amount of chlorine supplied. In the case of exposure to an incandescent lamp (wavelength from about 4,000 to 5,500 A.), a reaction temperature of from 60° to 70°C. and a supply of chlorine of about 40 to 70 liters per hour per kilogram of polyvinyl chloride, the prereaction may last for from about 30 to 60 minutes.

The main reaction is preferably carried out immediately after the prereaction in the same reactor. It should take place substantially in the absence of light. This may be done by darkening the room in which the reaction equipment is located or more simply by covering the reaction apparatus. Slight irradiation with light such as may occur through leaks in the covering screen is not detrimental provided it is so weak that the rate of the chlorination reaction is not affected. The reaction temperature in the main reaction is higher than the softening point of the vinyl chloride polymer to be chlorinated. It is advisable not to exceed a temperature of about 120°C. because otherwise the chlorination takes place preferentially at the point where the gaseous chlorine enters. The resultant irregular chlorination results in local overheating which may result in discolorations. It is therefore preferred to chlorinate at temperatures of from 90° to 110°C. The main reaction generally lasts from 2 to 4 hours and in all cases is longer than the prereaction.

The chlorination product should have a chlorine content of from about 63 to 65 percent. At chlorine contents of more than 70 percent the dimensional stability under heat is very high, but the thermostability is so low that it is hardly possible to avoid discoloration in processing operations.

The products may be mixed with additives conventionally used with vinyl chloride polymers, for example with stabilizers, pigments, dyes, lubricants and fillers.

Since the products have a high dimensional stability under heat, they may be used whereever moldings having dimensional stability are required. Because of their transparency they may be used in some places as a substitute for special glasses. They are particularly well suited for hot water pipes and waste water pipes, applications in which their low flammability is particularly useful.

The following examples illustrate the invention. Parts and percentages specified in the examples are by weight.

The products are stabilized by adding 3 percent of basic lead sulfate and 0.5 percent of lead stearate prior to testing. Dimensional stability under heat or softening point according to VICAT is determined according to DIN 53,460.

For measuring the thermostability a sample of the product is intensely kneaded on rollers at 190°C. until the first noticeable change in color takes place.

K values are measured according to H. Fikentscher, Cellulose-Chemie 13 (1932), page 60.

EXAMPLE 1

100 parts of suspension polyvinyl chloride having a K value of 56 and a softening point of 80°C. is treated for 5 minutes with 30 parts per hour of gaseous chlorine in a rotary tube at 60°C. while being exposed to radiation from an ultraviolet lamp. The lamp is then removed and chlorination is continued with 20 parts of chlorine per hour for 2 ½ hours at 100°C. After blowing out with nitrogen, a product is obtained having a chlorine content of 63 percent which has a VICAT number of 104°C. and a thermostability of 120 minutes at 190°C.

EXAMPLE 3

100 parts of suspension polyvinyl chloride having a K value of 70 and a softening point of 82°C. is treated in a rotary tube at 70°C. while being exposed to the light of an incandescent electric lamp with 20 parts of gaseous chlorine per hour for 30 minutes. The lamp is then removed and the reaction is continued with the same amount of chlorine for another 3 hours at 110°C. A product is obtained which has a chlorine content of 65 percent, a VICAT number of 112°C. and a thermostability at 190°C. of 100 minutes.

COMPARATIVE EXPERIMENTS a. As in Example 3, the same amount of chlorine is used for the same time at a temperature of 70° to 80°C. but under continuous irradiation with ultraviolet light. A product is obtained which has a chlorine content of 66 percent, a VICAT number of 113°C. and a thermostability at 190°C. of only 45 minutes.

b. Under otherwise the same conditions, the supply of chlorine is increased to 70 parts per hour. After 1 hour a product is obtained which has a chlorine content of 64.8 percent, a VICAT number of only 107°C. and a thermostability of only 5 minutes at 190°C.

c. The pressure of Comparative Experiments (a) and (b) is followed but the chlorine is saturated with water vapor prior to entering the reactor at room temperature. Products having the same thermostability are obtained. Adding water vapor therefore has no effect on thermostability.

We claim:

1. A process for the chlorination of a vinyl chloride polymer selected from the class consisting of the homopolymer and copolymers of vinyl chloride containing up to 30 percent by weight of comonomer, which process comprises reacting said vinyl chloride polymer as a dry powder with gaseous chlorine in two stages, the chlorine being supplied at a rate of about 40 to 70 liters per hour per kilogram of polyvinyl chloride with the first stage chlorination being carried out at a temperature of about 60° to 70°C. under exposure to light radiation having a wavelength of from 4,000 to 5,000 A. for a period of about 30 to 60 minutes and with the second stage chlorination being carried out at a temperature of about 90° to 110°C. while substantially excluding light for a period of from about 2 to 4 hours.

2. A process as claimed in claim 1 in which a vinyl chloride homopolymer is chlorinated.

3. A process as claimed in claim 1 in which a vinyl chloride polymer having a K value of less than 75 is chlorinated.

4. A process as claimed in claim 1 in which a vinyl chloride polymer having a particle diameter of from 100 to 600 microns is chlorinated.

5. A process as claimed in claim 1 in which a vinyl chloride polymer having a particle diameter of from 200 to 400 microns is chlorinated.

6. A process as claimed in claim 1 wherein the two-stage chlorination is sufficient to provide a polymer product having a chlorine content of about 63 to 65 percent by weight.

* * * * *